UNITED STATES PATENT OFFICE.

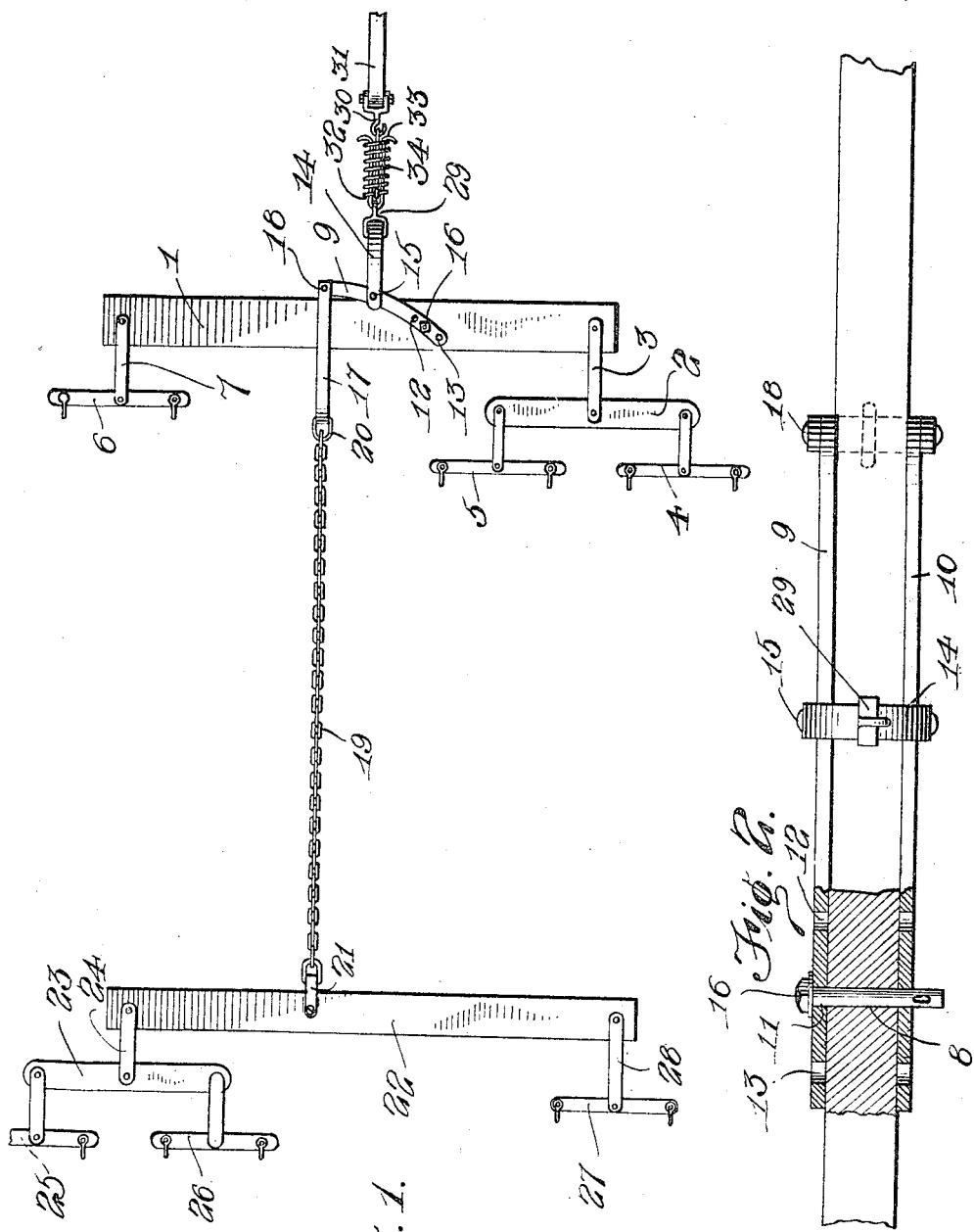

CHRIS W. CHRISTENSEN, OF GARFIELD, WASHINGTON.

DRAFT-EQUALIZER.

1,289,394.　　　　Specification of Letters Patent.　　Patented Dec. 31, 1918.

Application filed April 1, 1916.　Serial No. 88,346.

*To all whom it may concern:*

Be it known that I, CHRIS W. CHRISTENSEN, a citizen of the United States, residing at Garfield, in the county of Whitman and State of Washington, have invented certain new and useful Improvements in Draft-Equalizers, of which the following is a specification.

An object of my invention is to provide a draft equalizer which is so constructed that adjustment may be made to adapt the equalizer for use with five, six, or seven, or even a greater or less number of horses, and with which the same efficient results in use are accomplished in each of the adaptations.

A further object lies in the construction of the parts to be of such form that the device may be hitched and used in any of the adaptations where the ordinary two or three-horse equalizer can be used.

With the above and other objects in view, my invention consists in certain novel features of construction and combinations of parts which will be hereinafter set forth in connection with the drawings and then more particularly pointed out in the claim.

In the drawings:

Figure 1 is a plan view of the device showing the arrangement of parts for a six-horse hitch.

Fig. 2 is a view in elevation showing parts in section to better illustrate the details of the equalizer bars and attachment thereto.

It is the intention that the main evener 1 shall have three horses hitched thereto at all times, and for this purpose a two-horse evener 2 is connected by the links or by other suitable means at 3 to one end of the main evener 1, the whiffletrees 4 and 5 being attached to the two-horse evener 2. A whiffletree 6 is attached by the links 7 or by other suitable means to the remaining end of the main evener 1, and thus three horses may be hitched abreast to the whiffletrees 4, 5, and 6. The evener 1 has an opening 8 provided therethrough for the main hitch, and this opening is located in closer approximity to the end of the evener to which the two-horse equalizer 2 is connected than to the end to which the whiffletree 6 is attached, this being proportioned so that as the draft animals pull on the whiffletrees, 4, 5, and 6, the load will be equalized upon each of the animals.

A pair of equalizer bars 9 and 10 are made curved throughout their length and these equalizer bars are adapted to be fitted on the upper and lower sides of the evener 1 in the relation shown in Fig. 2, the spaced-apart openings 11, 12, and 13, being provided through each of the equalizer bars near one end. A hitch clevis 14 is pivoted at its ends to the equalizer bars 9 and 10 by the pins or rivets 15, at the approximate centers of these bars, and this attachment of the bars to the clevis 14 holds the same in such relation that the spaced-apart openings 11, 12, and 13 of the two bars are alined. A king pin or bolt 16 is provided to be passed through a pair of alined openings of the equalizer bars 9 and 10 and through the hitch opening 8 of the evener 1 and in this way the clevis 14 is mounted rearwardly of the evener 1 and the equalizer bars 9 and 10 are above and below the evener to be capable of pivotal swinging movement around the king pin or bolt 16.

A lead clevis 17 is connected at its ends to the free ends of the equalizer bars 9 and 10 by the rivets or pins 18, and a lead chain 19 is connected with a ring 20 secured on the clevis 17 and is led forwardly to connect with the hitch clevis 21 of the three-horse lead evener 22. In the present disclosure, the six-horse hitch is illustrated, and in this adaptation, the king pin or bolt 16 is passed through the central openings 11 of the equalizer bars 9 and 10, and the three-horse lead evener has a two-horse evener 23 connected on one end thereof through the medium of links 24 or other suitable means, the whiffletrees 25 and 26 being mounted on this evener 23 and a swingletree 27 being connected to the opposite end of the lead evener 22 through the medium of the links 28 or in any other approved manner. It will of course be understood that the connection of the hitch clevis 21 with the lead evener 22, when three horses are to be hitched in the lead will be offset to one side of the center so that the load will be equally distributed upon the three draft animals. A hook 29 is attached to the hitch clevis 14 and this hook may be fitted through a clevis 30 carried by a plow beam 31 or may be attached in any other way to the vehicle or implement to which draft is to be applied. By reason of the fact that it will doubtless not be possible to so start the horses that they will start forward simultaneously, it is perhaps desirable that the flexible connection be provided between the hook 29 and the parts through which the hitch is to be accomplished, and for this purpose the hook stirrup 32 may be provided to be engaged by the hook 29 and a similar stirrup 33 to be connected with the parts to which draft is to be applied, a coil spring 34 being fitted around these stirrups in such relation that as the stirrups are mounted in the operative relation and draft is applied, the draft will be directly against the spring 34 and in consequence the pull will be cushioned.

In the use of the device as described, draft animals will be hitched to the whiffletrees 4, 5, 6, 25, and 26 and to the swingletree 27, the hitch to the load being accomplished through the hook 29 or through the clevis 14, and as the pull is given through forward movement of the draft animals, by reason of the fact that the hitch clevis 14 is connected substantially midway between the mounting of the king pin or bolt 16 by which the main evener 1 is hitched and the connection of the lead clevis 17 with the equalizer bars 9 and 10, which latter clevis leads to the three-horse lead evener, the strain of the draft will be substantially equalized upon the draft animals. When the device is to be used as a five-horse evener, the same hitch of the draft animals to the evener 1 will be obtained, but the king pin or bolt 16 will be passed through the opening 12 of the equalizer bars 9 and 19 and through the hitch opening 8 of the evener 1, a doubletree being connected with the hitch clevis 21, and thus as greater leverage is obtained upon the ends of the equalizer bars to which the lead clevis 17 is connected, the draft strain will be equalized. When the device is to be used as a seven-horse equalizer, a four-horse lead evener will be connected with the hitch clevis 21, and under these circumstances, it will of course be necessary to obtain greater leverage for the animals drawing upon the main evener 1, in view of which fact, the king pin or bolt 16 is adjusted to pass through the openings 13 of the equalizer bars 9 and 10 and through the hitch opening 8 of the evener 1.

From the foregoing it will be seen that I have provided a very efficient draft equalizer which is very simple in the construction of its parts and in the assembly of the same, being equally simple in its adjustment for the accommodation of various numbers of animals, and while I have described the device as being adaptable for use with five, six, or seven draft animals, it will be understood that by providing a greater number of openings through the equalizer bars 9 and 10, the device may be adapted to accommodate a greater or a lesser number of draft animals, it of course being understood that in all of the adaptations the evener 1 will have three draft animals hitched thereto and the evener 1 will have the hitch opening 8 thereof always at the same point, the variations being accomplished through adjustment of the king-pin or bolt to different openings in the equalizer bars 9 and 10, and the draft attachment to the hitch clevis 21 being changed to permit the hitching of a greater or less number of draft animals. Further while I have shown and described only one specific form of the invention, it will be understood that modifications and variations might be resorted to in the several parts and in the arrangement of the same without departing from the spirit and scope of my invention, and hence I do not wish to be limited except for such points as may be set forth in the claim.

I claim:—

A draft equalizer comprising a main evener bar adapted to have a number of draft animals hitched thereto and having a hitch opening formed in the middle portion thereof at a point to equalize draft strain upon the animals, a pair of curved equalizer bars provided with single openings near one end and having a plurality of spaced openings adjacent the remaining end which openings in each of the bars register, a substantially U-shaped hitch clevis connected at its ends to the middle portions of the curved equalizer bars to give the same pivotal mounting and to space these bars sufficiently so that the main evener bar fits loosely therebetween, a substantially U-shaped lead clevis connected at its ends in the single openings of the curved equalizer bars and made sufficiently spread to receive the main evener bar, spring means by which the hitch connection is accomplished from the hitch clevis, means connected with said lead clevis to allow for hitching of several draft animals, and a king pin to be adjustably fitted through the opening of the evener bar and through the spaced openings of the curved equalizer bars to equalize the draft upon opposite ends of the equalizer bars with the point of attachment of the hitch clevis as a center.

In testimony whereof I affix my signature in presence of two witnesses.

CHRIS W. CHRISTENSEN.

Witnesses:
I. M. McCarthy,
E. C. Johnson, Jr.

Copies of this patent may be obtained for five cents each, by addressing the "Commissioner of Patents, Washington, D. C."